United States Patent
Holman, IV et al.

(10) Patent No.: US 8,540,062 B2
(45) Date of Patent: Sep. 24, 2013

(54) LOW PROFILE ROTARY DAMPER

(75) Inventors: Martin Earl Holman, IV, West Palm Beach, FL (US); Bruce Alan Ivanik, Boca Raton, FL (US); Douglas Wayne Moskowitz, Weston, FL (US)

(73) Assignee: Research In Motion Limited, Waterloo, Ontario (CA)

( * ) Notice: Subject to any disclaimer, the term of this patent is extended or adjusted under 35 U.S.C. 154(b) by 138 days.

(21) Appl. No.: 13/112,119

(22) Filed: May 20, 2011

(65) Prior Publication Data

US 2012/0293923 A1 Nov. 22, 2012

(51) Int. Cl.
*F16D 57/00* (2006.01)

(52) U.S. Cl.
USPC .......................................... 188/290; 188/306

(58) Field of Classification Search
None
See application file for complete search history.

(56) References Cited

U.S. PATENT DOCUMENTS

| | | | | |
|---|---|---|---|---|
| 4,635,763 A | * | 1/1987 | Omata | 188/268 |
| 4,691,811 A | * | 9/1987 | Arakawa et al. | 188/290 |
| 4,773,514 A | * | 9/1988 | Gustafsson | 188/306 |
| 4,830,151 A | * | 5/1989 | Numata | 188/290 |
| 5,133,433 A | * | 7/1992 | Oosawa | 188/290 |
| 5,169,220 A | | 12/1992 | Herr et al. | |
| 5,211,267 A | * | 5/1993 | Clark | 188/276 |
| 5,269,397 A | * | 12/1993 | Kawamoto et al. | 188/290 |
| 5,374,117 A | | 12/1994 | Herr et al. | |
| 5,449,054 A | * | 9/1995 | Wiese et al. | 188/296 |
| 6,154,924 A | * | 12/2000 | Woo | 16/62 |
| 6,318,522 B1 | | 11/2001 | Johnston et al. | |
| 6,499,818 B2 | * | 12/2002 | Brustle | 312/319.1 |
| 6,520,302 B1 | * | 2/2003 | Ross | 188/268 |
| 6,729,448 B2 | * | 5/2004 | Takahashi | 188/294 |
| 7,048,098 B1 | * | 5/2006 | Moradian | 188/306 |
| 7,111,773 B1 | | 9/2006 | So et al. | |
| 7,204,354 B2 | * | 4/2007 | Tomonaga | 188/308 |
| 7,207,425 B2 | * | 4/2007 | Hayashi et al. | 188/290 |
| 7,599,721 B2 | * | 10/2009 | Taki et al. | 455/575.1 |
| 7,752,710 B2 | * | 7/2010 | Lin | 16/334 |
| 7,789,207 B2 | * | 9/2010 | Norman | 188/306 |
| 8,136,645 B2 | * | 3/2012 | Kobayashi et al. | 188/290 |
| 2001/0036266 A1 | * | 11/2001 | Gronroos et al. | 379/433.01 |
| 2002/0069483 A1 | | 6/2002 | Savolainen et al. | |

(Continued)

FOREIGN PATENT DOCUMENTS

DE 10354424 A1 6/2004
EP 0997869 A2 5/2000

(Continued)

OTHER PUBLICATIONS

Extended European Search Report for EP Application No. 11167000.6 dated Nov. 7, 2011.

*Primary Examiner* — Thomas Irvin

(74) *Attorney, Agent, or Firm* — Jose Gutman; Fleit Gibbons Gutman Bongini & Bianco PL

(57) ABSTRACT

A dampening assembly for a portable electronic device includes a housing. The housing includes a top portion and a bottom portion. A pivot arm is pivotably coupled to the bottom portion of the housing. A reservoir is defined between the top portion and the bottom portion. The reservoir includes at least one of a fluid and a viscous material. A first portion of the pivot arm is disposed within the reservoir. A second portion of the pivot arm extends through and above the top portion of the housing.

14 Claims, 10 Drawing Sheets

(56) References Cited

U.S. PATENT DOCUMENTS

| | | | |
|---|---|---|---|
| 2004/0045398 A1* | 3/2004 | Hayashi | .......... 74/574 |
| 2004/0060152 A1 | 4/2004 | Kim | |
| 2004/0099495 A1 | 5/2004 | Hayashi | |
| 2005/0097705 A1 | 5/2005 | Chen | |
| 2006/0032021 A1 | 2/2006 | Fukuo | |
| 2006/0050867 A1 | 3/2006 | Kawamoto | |
| 2006/0063416 A1 | 3/2006 | Takagi | |
| 2006/0080805 A1 | 4/2006 | Takagi | |
| 2006/0133796 A1 | 6/2006 | Qin et al. | |
| 2007/0131500 A1 | 6/2007 | Yen et al. | |
| 2007/0278725 A1 | 12/2007 | Miyamoto | |
| 2009/0126154 A1 | 5/2009 | Lin et al. | |
| 2009/0133217 A1 | 5/2009 | Lin | |
| 2009/0151120 A1 | 6/2009 | Lin | |
| 2009/0151121 A1 | 6/2009 | Lin | |
| 2009/0165246 A1 | 7/2009 | Lin | |

FOREIGN PATENT DOCUMENTS

| | | |
|---|---|---|
| EP | 1742448 A1 | 1/2007 |
| EP | 2003364 A2 | 12/2008 |
| GB | 2396681 | 6/2004 |
| GB | 2407143 | 4/2005 |
| GB | 2407846 | 5/2005 |
| WO | WO2007053944 | 5/2007 |
| WO | WO2007108197 | 5/2007 |
| WO | WO2007070958 | 6/2007 |

* cited by examiner

LOW PROFILE ROTARY DAMPER

FIELD OF THE DISCLOSURE

The present disclosure generally relates to mechanical dampers for portable electronic devices, and more particularly to a low profile rotary damper for use within portable electronic devices.

BACKGROUND

Many portable electronic devices comprise displays that can be moved independently from the keyboard or vice versa. For example, these devices usually allow the display to slide in a linear direction with respect to the keyboard. Conventional mechanisms currently used to provide this type of movement generally include bumpers that stop the movement of the display or keyboard at a designated location. This configuration can be problematic because the bumpers can be easily damaged or compromised when the device is dropped or when too much force is exerted on the pers when moving the display/keyboard.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
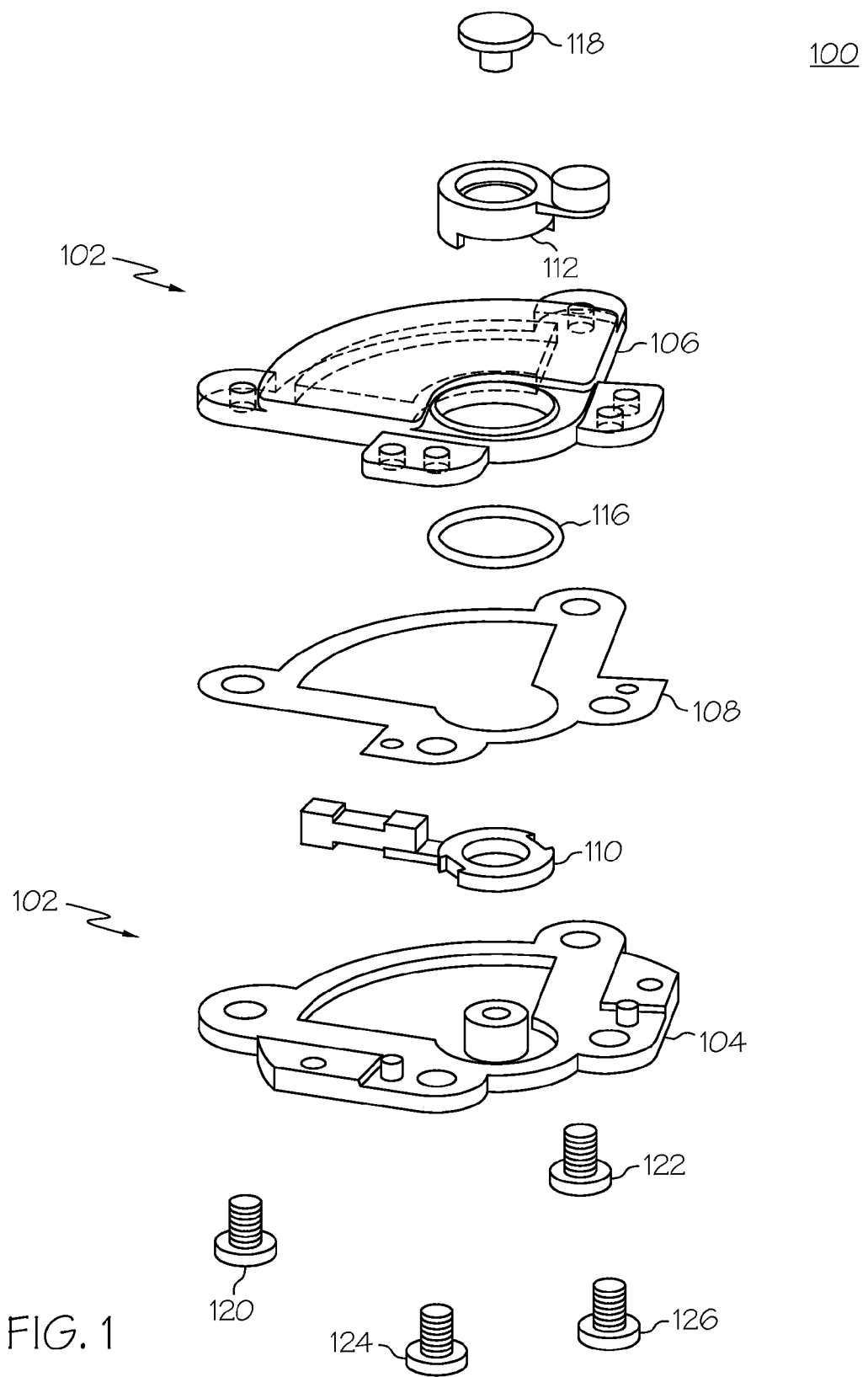
FIG. 1 is a side-exploded view of a low profile rotary damper assembly according to one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having" as used herein, are defined as comprising (i.e. open language). The term "coupled" as used herein, is defined as "connected" although not necessarily directly, and not necessarily mechanically.

The term "wireless communication device" is intended to broadly cover many different types of devices that can wirelessly receive signals, and in most cases can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a laptop/computer, a personal digital assistant, and other similar devices.

The term "portable electronic device" is intended to broadly cover many different types of electronic devices that are portable. For example, and not for any limitation, a portable electronic device can include any one or a combination of the following: a wireless communication device, a laptop computer, notebook computer, personal computer, Personal Digital Assistant, tablets, and other handheld electronic devices that can be carried on one's person.

Described below is a dampening assembly or low profile rotary damper for a portable electronic device such as, but not limited to a wireless communication device. The dampening assembly comprises a housing. The housing includes a top portion and a bottom portion. A pivot arm is pivotably coupled to the bottom portion of the housing. A reservoir is defined between the top portion and the bottom portion. The reservoir comprises at least one of a fluid and a viscous material. A first portion of the pivot arm is disposed within the reservoir. A second portion of the pivot arm extends through and above the top portion of the housing.

The low profile rotary damper provides a dampening force that reduces the velocity of a slide mechanism when approaching the end of its travel. This reduction in velocity reduces the force exerted on bumpers of the slide mechanism at the end of travel and also reduces any noise generated as the slide mechanism comes to a stop. The low profile rotary damper, in one example, comprises a reservoir that is filled with a fluid or viscous material. As the slide mechanism is moved in a linear direction a portion of the slide mechanism exerts a force on a pivoting member of the low profile rotary damper. As the pivoting member is rotated, a portion of the pivoting member passes through the fluid or viscous material within the reservoir, thereby exerting a force on this portion of the pivoting member. This force is translated back to the slide mechanism, thereby providing a dampening effect that reduces the velocity of travel of the slide mechanism. The force exerted against the slide mechanism is a function of the velocity of travel (e.g., the higher the velocity, the higher the force).

Various materials or combinations of materials can be used to construct the low profile rotary damper and its components. For example, materials such as plastics, metals, metal alloys, composites, ceramics, and other inorganic or organic materials or combinations thereof may be used.

Low Profile Rotary Damper

FIG. 1 is an exploded view of a low profile rotary damper assembly 100 according to one example. The damper assembly 100 comprises a housing 102 that includes a bottom portion 104 and a top portion 106. A gasket 108 is disposed between the bottom and top portions 104, 106 of the housing 102. A first portion 110 of a pivot arm 1001 (FIG. 10) is also disposed between the bottom and top portions 104, 106 of the housing 102. A second portion 112 of the pivot arm 1001 is disposed within a first cavity 320 (FIG. 3) defined in the top portion 106 of the housing 102 and mates with the first portion 110 of the pivot arm 1001. A sealing member 116 such as, but not limited to, an o-ring is also disposed within the first cavity 320.

Figure 2:
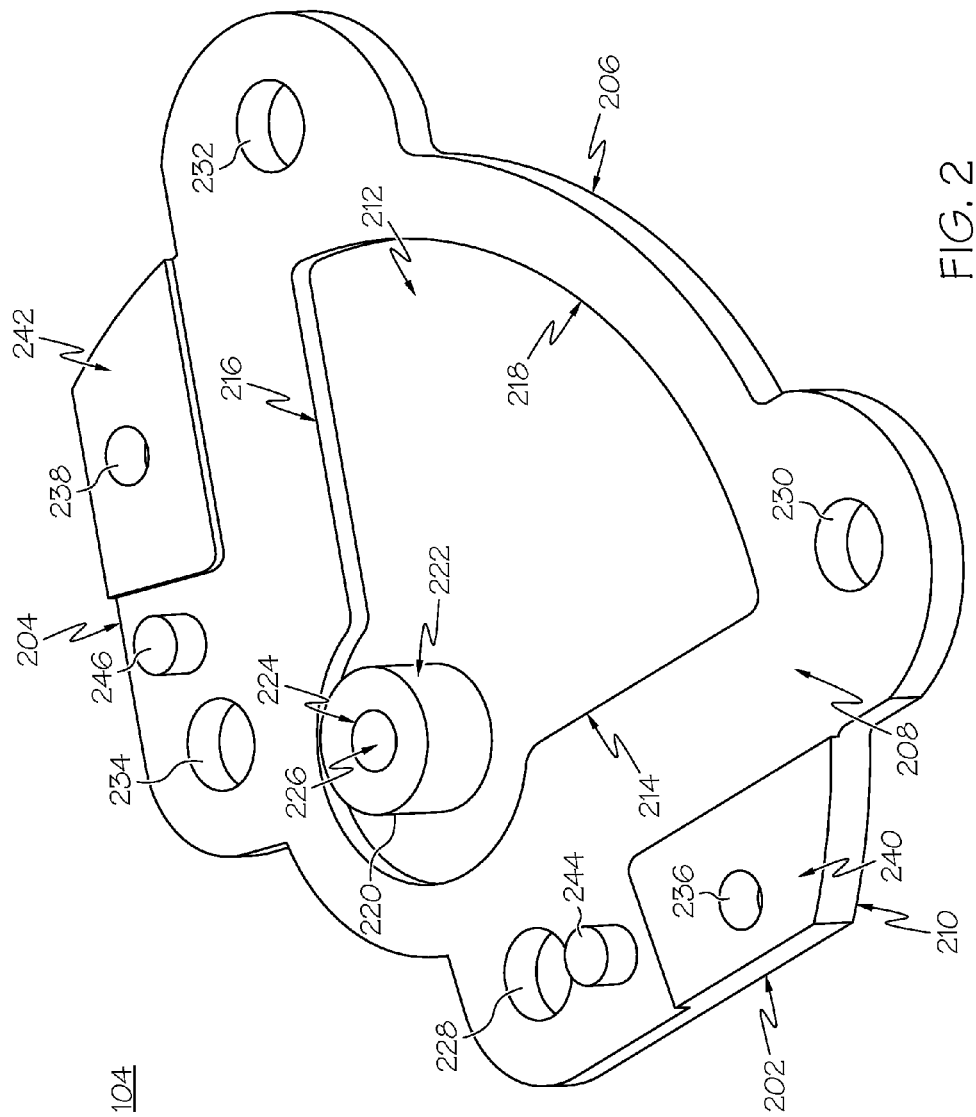
FIG. 2 is a top-side view of a bottom portion of a housing for the low profile rotary damper assembly of FIG. 1 according to one example.

FIG. 2 shows a top-side view of the bottom portion 104 of the housing 102. The bottom portion 104 acts as a base member for the housing 102. The bottom portion 104 comprises a substantially curved configuration, where a first side 202 and a second side 204 angle outwards away from a center of the bottom portion 104. A third side 206 couples the first side 202 to the second side 204 and curves outward from the center of the bottom portion 104.

The bottom portion 104 comprises a top surface 208 and a bottom surface 210. The top surface 208 comprises a second recessed area 212 that comprises a substantially curved configuration. More specifically, the second recessed area 212 is recessed into the top surface 208 towards the bottom surface 210. For example, a first side 214 and a second side 216 of the second recessed area 212 angle outwards away from a center of the second recessed area 212. A third side 218 couples the first side 214 to the second side 216 and curves outward from the center of the second recessed area 212. In this example, the first side 214 of the recessed area corresponds to the first side 202 of the bottom portion 104, the second side 216 of the second recessed area 212 corresponds to the second side 204 of the bottom portion 104, and the third side 218 corresponds to the third side 206 of the bottom portion 104.

The second recessed area 212 comprises a vertical member 220 that extends above the top surface 208 of the bottom portion 104. The vertical member 220 comprises an outer wall 222 and an inner wall 224 that defines a cavity 226. The cavity 226 is configured to receive a fastening member 118 (FIG. 1) such as, but not limited to, a screw, a bolt, a rivet, or the like. The fastening member 118 retains the second portion 112 (and hence the first portion 110) of the pivot arm 1001 around vertical member 220. The bottom portion 104 also comprises a first plurality of fastening areas 228, 230, 232, 234 that correspond to a plurality of fastening areas 302, 304, 306, 308 (FIG. 3) disposed on the top portion 106 of the housing 102. These fastening areas 228, 230, 232, 234 and 302, 304, 306, 308 are configured to receive fastening members 120, 122, 124, 126 (FIG. 1) such as, but not limited to, a screw, a bolt, a rivet, or the like for coupling the bottom portion 104 of the housing 102 to the top portion 106 of the housing. It should be noted that the gasket 108 is disposed between the bottom and top portions 104, 106 of the housing 102 to provide a seal between the two portions 104, 106.

The bottom portion 104 also comprises a second plurality of fastening areas 236, 238 that is configured to receive a set of fastening members for coupling a guide base 402 (FIG. 4) of a slide mechanism 1003 (FIG. 10) to the bottom portion 104. The second plurality of fastening areas 236, 238 is disposed on an exposed portion 240, 242 of the first and second sides 202, 204 that extends out and away from the corresponding first and second sides 310, 312 (FIG. 3) of the top portion 106. In other words, the exposed portion 240, 242 of the first and second sides 202, 204 of the bottom portion 104 of the housing 102 do not touch the top portion 106.

Figure 3:
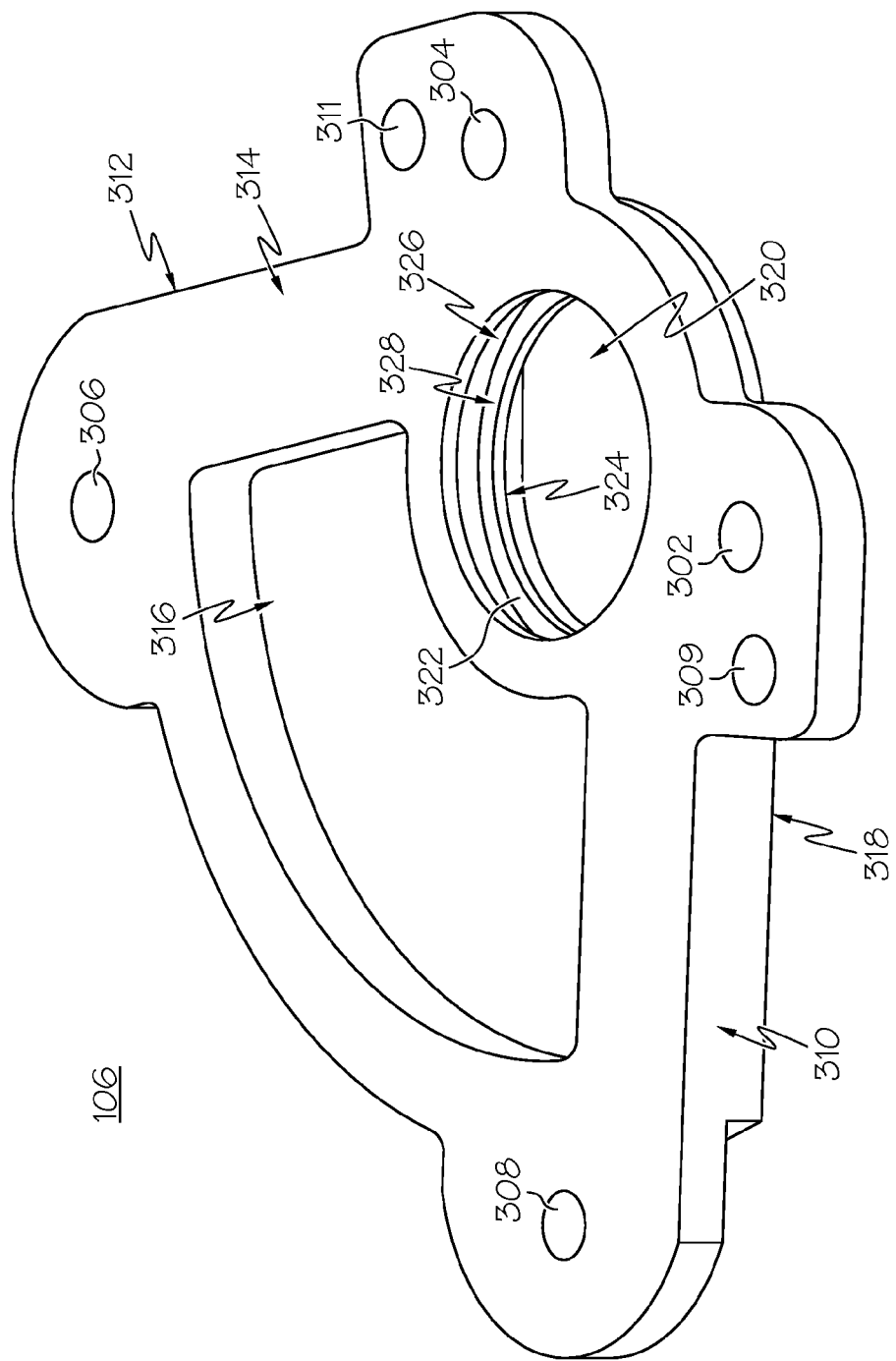
FIG. 3 is a bottom-side view of a top portion of the housing for the low profile rotary damper assembly of FIG. 1 according to one example.

FIG. 3 shows a bottom-side view of the top portion 106 of the housing 102. As can be seen, the top portion 106 of the housing 102 comprises a configuration that substantially corresponds to the bottom portion 104 of the housing 102 discussed above. When the top portion 106 is disposed on top of and coupled to the bottom portion 104, the bottom surface 314 of the top portion 106 abuts the top surface 208 of the bottom portion 104. In addition to the fastening areas 302, 304, 306, 308 discussed above, the top portion 106 also comprises a set of mating areas 309, 311 that are configured to receive a set of vertical mating members 244, 246 (FIG. 2) disposed on the top surface 208 of the bottom portion 104. These mating areas 309, 311 and mating members 244, 246 provide additional rigidity to the housing 102.

The top portion 106 also comprises a first recessed area 316 that substantially corresponds to at least a portion of the second recessed area 212 disposed on the bottom portion 104. The first recessed area 316 of the top portion 106 is recessed into the bottom surface 314 towards a top surface 318 of the top portion 106. The second recessed area 212 of the bottom portion 104 of the housing 102 and the first recessed area 316 of the top portion 106 of the housing 102 form a reservoir 930 (see FIGS. 9-12) for retaining a fluid or viscous material 931 (see FIGS. 9-12) therein such as, but not limited to, oil, grease, or the like.

A first cavity 320 extends through the top surface 318 of the top portion 106 to the bottom surface 314 of the top portion 106. This first cavity 320 is configured to receive the vertical member 220 of the bottom portion 104 of the housing 102. The diameter of the first cavity 320 is larger than the diameter of the vertical member 220. The first cavity 320 comprises an inner edge 322 that traverses the first cavity 320. The inner edge 322 defines a first portion 324 of the first cavity 320 between the top surface 318 of the top portion 106 of the housing 102 and a top surface 902 (FIG. 9) of the inner edge 322. The inner edge 322 also defines a second portion 326 of the first cavity 320 between a bottom surface 328 of the inner edge 322 and the bottom surface 314 of the bottom portion 104 of the housing 102. The diameter of the inner edge 322 is smaller than the diameter of the first portion 324 of the first cavity 320 and the second portion 326 of the first cavity 320.

Figure 4:
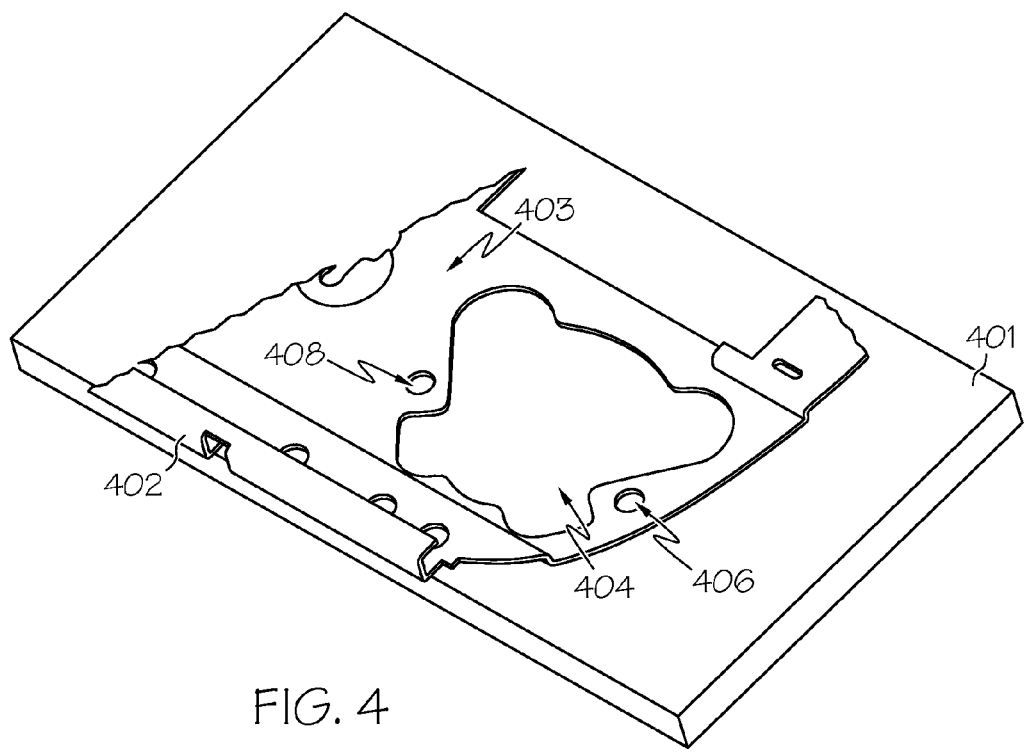
FIG. 4 is a top-side view of a guide base of a slide mechanism according to one example.
Figure 5:
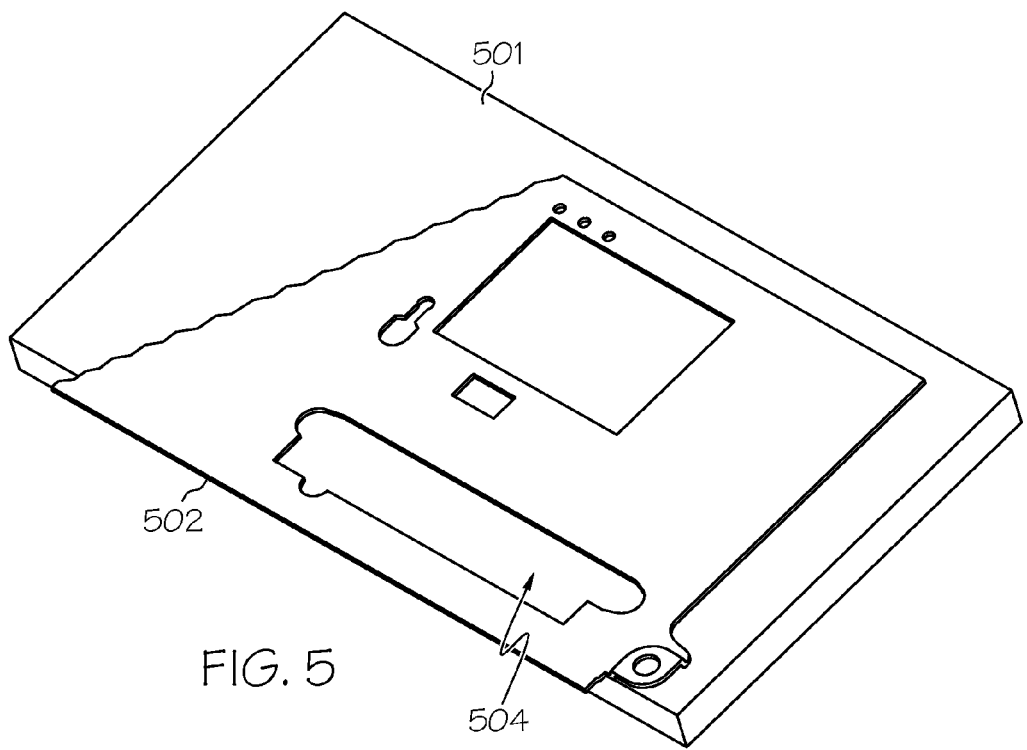
FIG. 5 is a top- side view of a slide base of a slide mechanism according to one example.

FIG. 4 shows one example of the guide base 402 that comprises a cut-out area 404 corresponding to the housing 102 of the damper assembly 100. Geometry of the bottom portion 104 of the housing 102 substantially conforms to the cut-out area 404 of the guide base 402. In one example, the guide base (e.g., a guide member) 402 remains stationary while a slide plate (e.g., a transitioning member) 502 (FIG. 5) slides along the guide base 402. The slide plate 502 comprises an engagement area 504 that engages a portion of the pivot arm 1001 and transitions a portion (e.g., display) of a portable electronic device 1000 coupled thereto in a linear direction as the slide plate 502 slides along the stationary guide base 402. In one example, the engagement area 504 is a cut-out area that engages an outer wall 830 of a vertical engagement member 828 (FIG. 8) of the second portion 112 of the pivot arm. However, other configurations are also applicable. It should be noted that one or more examples of the present disclosure are also applicable to portable mechanical devices.

In one example, the guide base 402 is disposed over the housing 102 such that at least a region of the top portion 106 of the housing 102 extends above a top surface 403 of the guide base 402. The guide base 402 comprises a set of fastening areas 406, 408 that corresponds to the second plurality of fastening areas 236, 238 of the bottom portion 104 of the housing 102. When the guide base 402 is coupled to the housing 102, a bottom surface 410 (see FIG. 9) of the guide base 402 abuts the exposed portions 240, 242 of the first and second sides 202, 204 of the bottom portion 104 of the housing 102.

Figure 6:
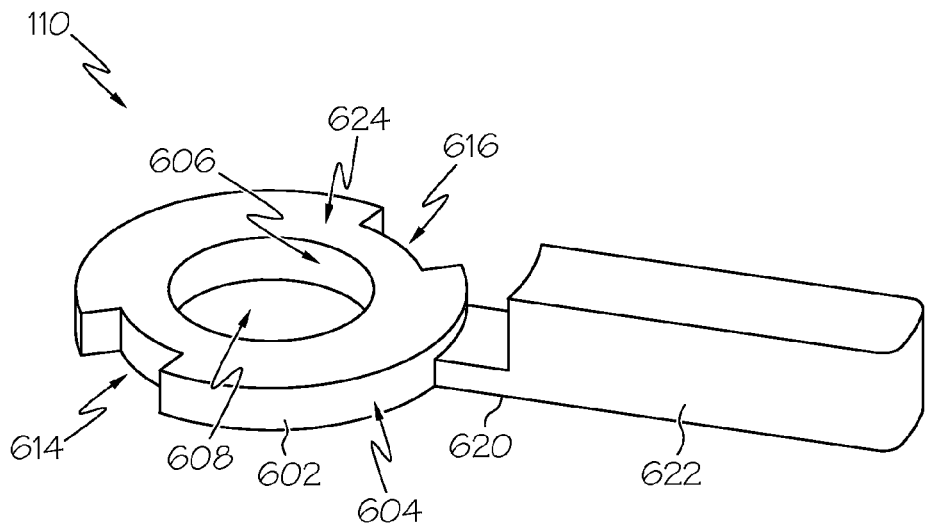
FIGS. 6-7 are top-side views of various examples of a first portion of a pivot arm of the low profile rotary damper assembly of FIG. 1 according to one example.
Figure 7:
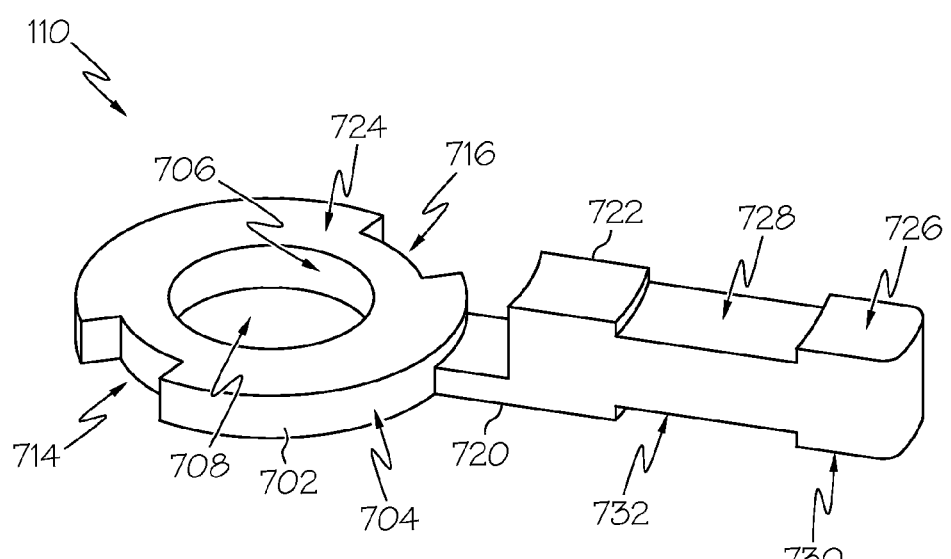

As discussed above, the pivot arm 1001 comprises a first portion 110 and a second portion 112. FIGS. 6-7 show two examples of the first portion 110 of the pivot arm. FIG. 6 shows that the first portion 110 comprises a first annular member 602 that comprises a first outer wall 604 and a first inner wall 606. The first inner wall 606 defines a second cavity 608 that is configured to receive the vertical member 220 of the bottom portion 104 of the housing 102. One or more portions of the first outer wall 604 comprise a recessed area 614, 616 that is configured to mate with a corresponding portion 816, 818 (FIG. 8) of the second portion 112 of the pivot arm 1001. A first elongated member 620 extends outward in a lateral direction from the first outer wall 604 of the first annular member 602. The first elongated member 620 comprises an extended region 622 that extends above a top surface 624 of the first annular member 602.

FIG. 7 shows another example of the first portion 110 of the pivot arm 1001. FIG. 7 shows that the first portion 110 comprises an annular member 702 that includes an outer wall 704 and an inner wall 706. The inner wall 706 defines a third cavity 708 that is configured to receive the vertical member 220 of the bottom portion 104 of the housing 102. One or more portions 710, 712 of the outer wall 704 comprise a recessed area 714, 716 that is configured to mate with a corresponding portion 816, 818 (FIG. 8) of the second portion 112 of the pivot arm 1001. An elongated member 720 extends outward in a lateral direction from the first outer wall 604 of the first annular member 602. The elongated member 720 comprises an extended region 722 that extends above a top surface 724 of the annular member 702. In the example of FIG. 7 a top surface 726 of the extended region 722 comprises a recessed area 728. A bottom surface 730 of the extended region 722 comprises a recessed area 732 that corresponds to the recessed area 728 of the top surface 726.

As the pivot arm 1001 pivots about the vertical member 220 of the bottom portion 104 of the housing 102, the extended region 622 of the first elongated member 620 (or the extended region 722 of the elongated member 720) is rotated through the fluid or viscous material in the reservoir. A force is exerted on the extended region 622 by the fluid or viscous material, which is translated to the guide base 402 or slide plate 502 (depending on the given configuration of the slide mechanism 1003) as a dampening force. Therefore, the pivot arm 1001 provides a dampening effect that reduces the velocity of the guide base 402 or slide plate 502 and corresponding first and second portions 401, 501 of a portable electronic device 1000 (FIG. 10) coupled thereto. In one example, the first portion 401 of the portable electronic device 1000 comprises a keyboard (not shown) and the second portion 501 of the device 1000 comprises a display (not shown). However, other configurations are applicable as well.

Figure 8:
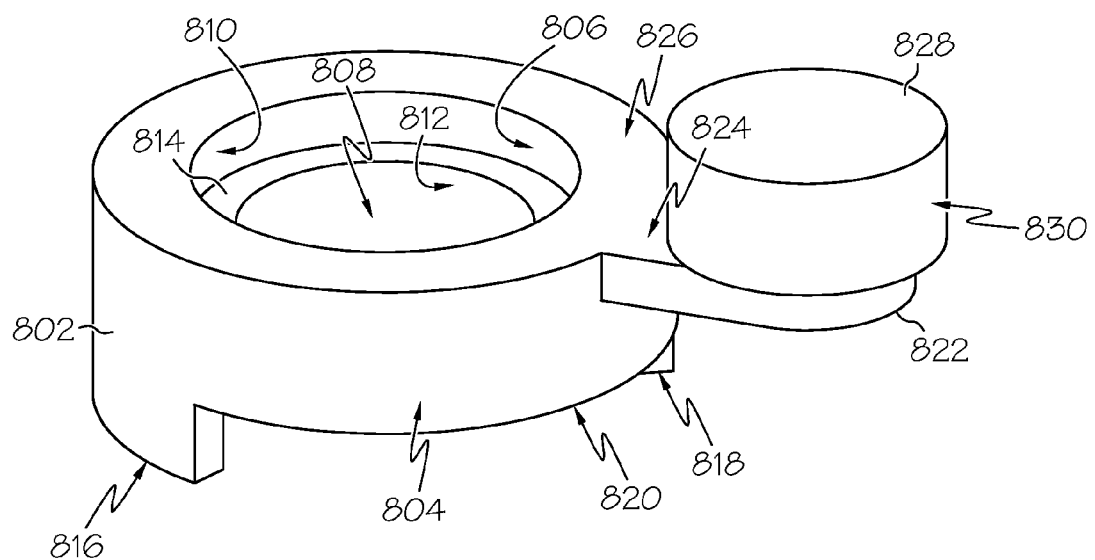
FIG. 8 is a top-side view of a second portion of a pivot arm of the low profile rotary damper assembly of FIG. 1 according to one example.

FIG. 8 shows a top-side view of the second portion 112 of the pivot arm 1001. This second portion 112 of the pivot arm 1001 includes a second annular member 802. The second annular member 802 comprises a second outer wall 804 and a second inner wall 806. A cavity 808 is defined by a first portion 810 of the second inner wall 806 and a second portion 812 of the second inner wall 806. The first and second portions 810, 812 of the second inner wall 806 are coupled to each other via a chamfered region 814 that traverses the second inner wall 806. The diameter of the first portion 810 is larger than the diameter of the second portion 812. The area of the cavity 808 defined by the first portion 810 of the second inner wall 806 is configured to receive a portion of the fastening member 118 that mates with the cavity 226 of the vertical member 220 of the bottom portion 104 of the housing 102. The area of the cavity 808 defined by the second portion 812 of the second inner wall 806 is configured to receive the vertical member 220 of the bottom portion 104 of the housing 102.

One or more mating members 816, 818 extend from the second outer wall 804 beyond a bottom surface 820 of the second annular member 802. These mating members 816, 818 are configured to mate with the corresponding recessed area 614, 616 of the first annular member 602 of the first portion 110 of the pivot arm 1001. A second elongated member 822 extends outward from the second outer wall 804. In one example, a top surface 824 of the second elongated member 822 is substantially flush with a top surface 826 of the second annular member 802. However, other configurations are applicable as well. A vertical engagement member 828 extends from the top surface 824 of the second elongated member 822 and above the top surface 826 of the second annular member 802. In one example, this vertical engagement member 828 engages the engagement area 504 of the slide plate 502 as the slide plate 502 is moved in a linear direction relative to the guide base 402. This area 504 of the slide plate 502 exerts a force on the vertical engagement member 828 that rotates the pivot arm 1001 around the vertical member 220 of the bottom portion 104 of the housing 102.

Figure 9:
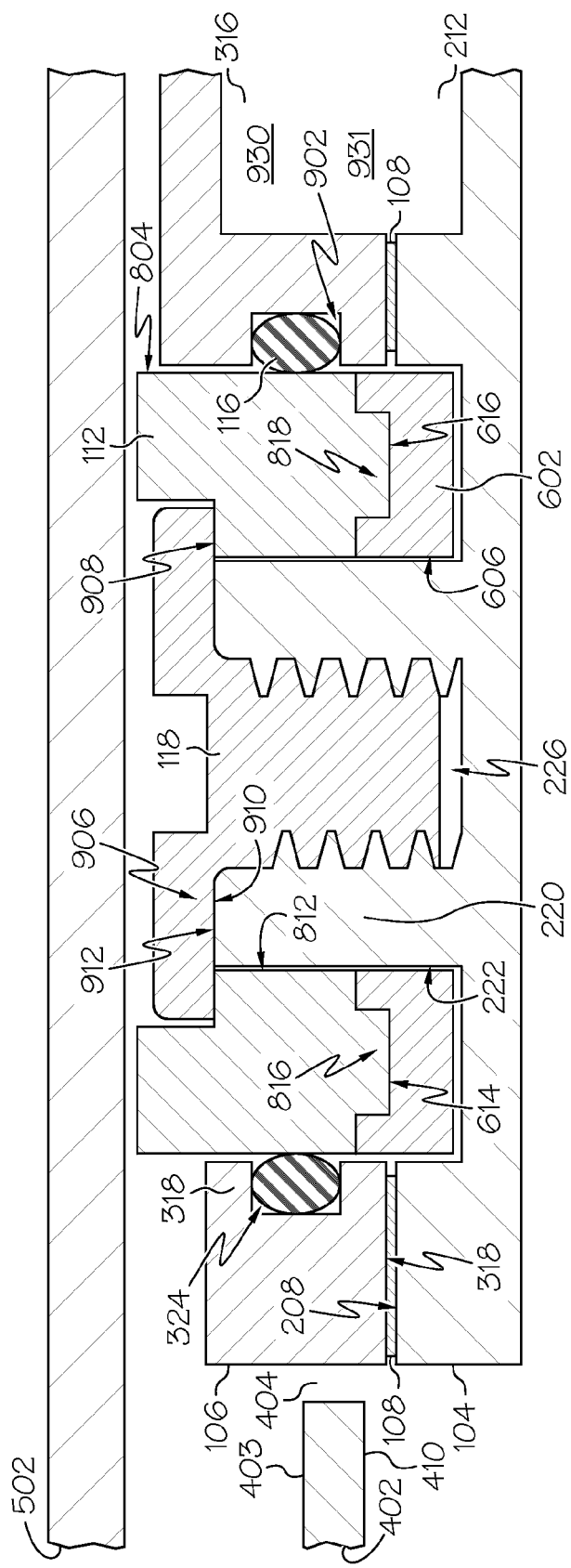
FIG. 9 is a cross-sectional view of the low profile rotary damper assembly of FIG. 1 according to one example.
Figure 10:
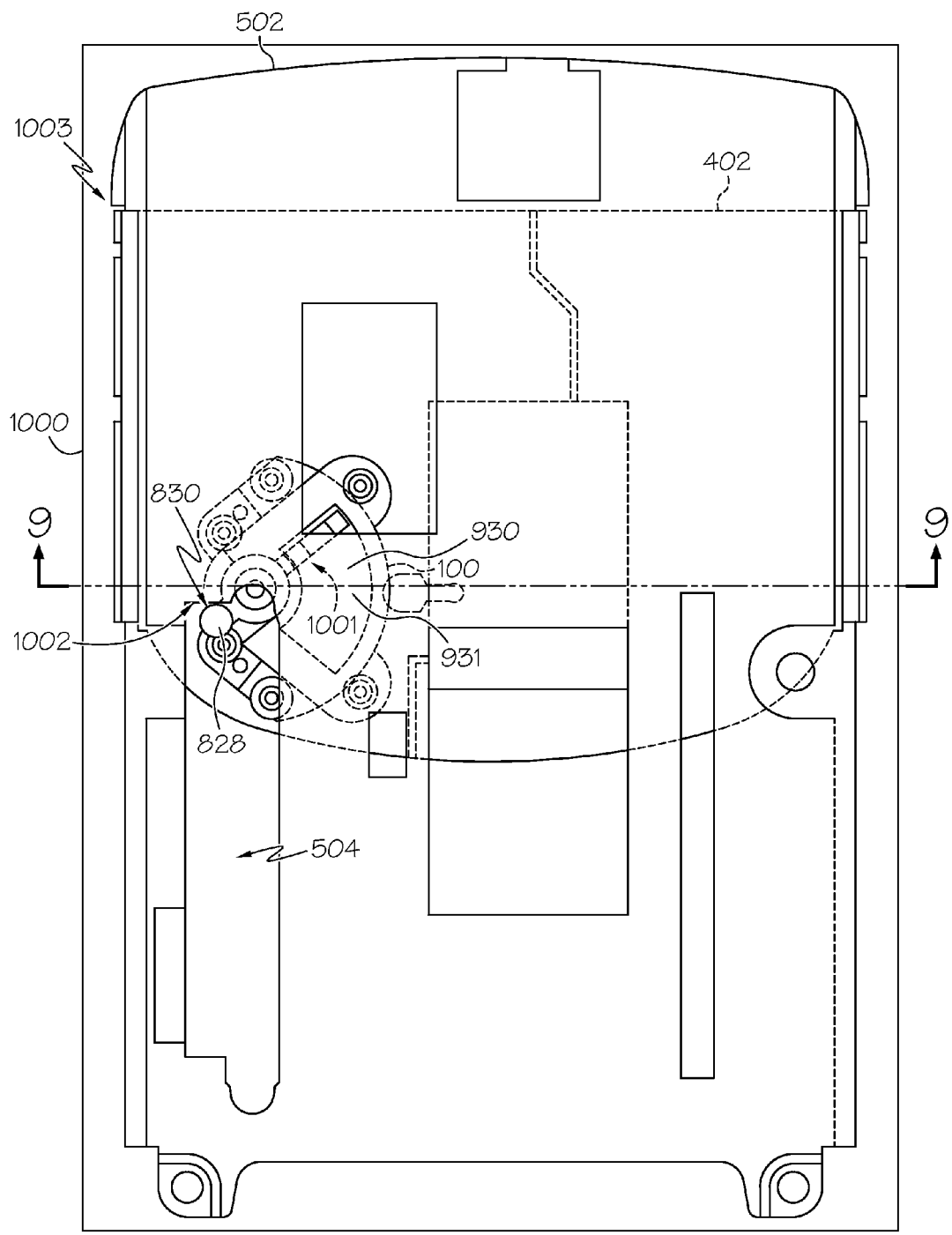
FIGS. 10-12 show a sequence of a slide mechanism transitioning from a first position to a second position and how the slide mechanism encounters the low profile rotary damper assembly of FIG. 1 during this transition according to one example.

FIG. 9 shows a cross-sectional view through cut line 9-9 of FIG. 10 of the damper assembly 100. As can be seen from FIG. 9, the first inner wall 606 of the first annular member 602 of the first portion 110 of the pivot arm 1001 circumscribes the outer wall 222 of the vertical member 220 of the bottom portion 104 of the housing 102. The second portion 812 of the second inner wall 806 of the second portion 112 of the pivot arm 1001 circumscribes the outer wall 222 of the first annular member 602 that comprises a first outer wall 604. FIG. 9 also shows that the mating members 816, 818 of the second portion 112 of the pivoting arm 1001 are mated with the corresponding recessed areas 614, 616 of the first portion 110 of the pivot arm 1001. Therefore, as the slide plate 502 exerts a force on the vertical engagement member 828 of the second portion 112 of the pivot arm 1001, the second portion 112 and the first portion 110 are rotated about the vertical member 220 of the bottom portion 104 of the housing 102.

As can be seen in FIG. 9, a top portion 906 of the fastening member 118 extends beyond the vertical member 220 and over a top surface 908 of the chamfered region 814 of the second annular member 802 of the second portion 112 of the pivot arm 1001. A bottom surface 910 of the top portion 906 of the fastening member 118 abuts a top surface 912 of the vertical member 220 and is disposed over the top surface 908 of the chamfered region 814. This prevents the pivot arm 1001 from lifting out of the housing 102. It should be noted that one or more sealing members (not shown) can be disposed between the second portion 112 of the pivot arm 1001 and the top portion 906 of the fastening member 118 to further prevent the fluid or viscous material 931 within the reservoir 930 from escaping.

FIG. 9 further shows that the sealing member 116, in one example, is disposed within the first portion 324 of the first cavity 320 of the housing top portion 106. As can be seen, the sealing member 116 abuts the second outer wall 804 of the second portion 112 of the pivot arm 1001. This prevents any of the fluid or viscous material within the reservoir from escaping through the first cavity 320 of the housing top portion 106. The gasket 108 is disposed between the bottom surface 314 of the top portion 106 of the housing and the top surface 208 of the bottom portion 104 of the housing 102. The gasket 108 creates a seal between the bottom and top portions 104, 106 and prevents the fluid or viscous material within the reservoir from leaking.

Figure 11:
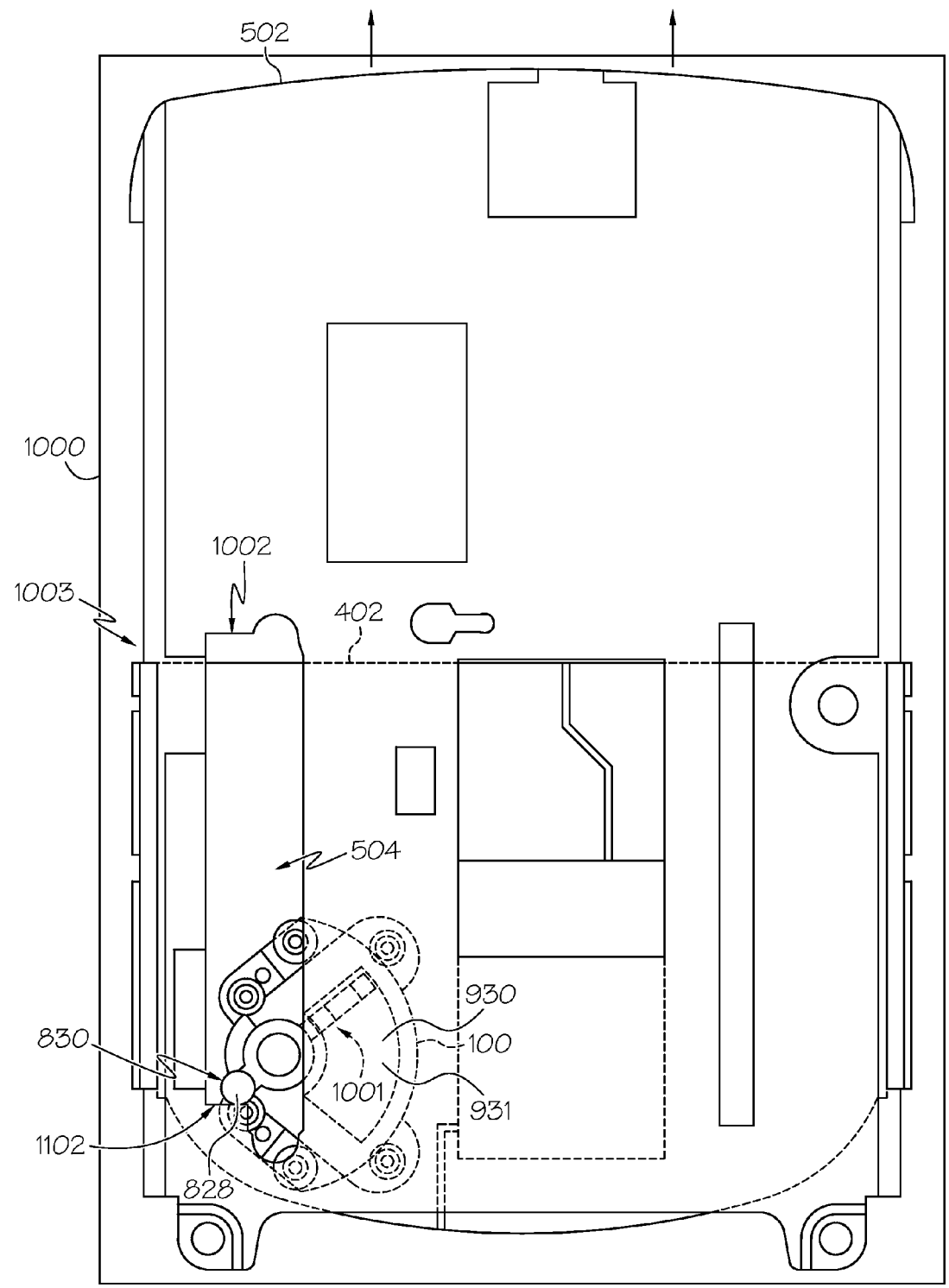
Figure 12:
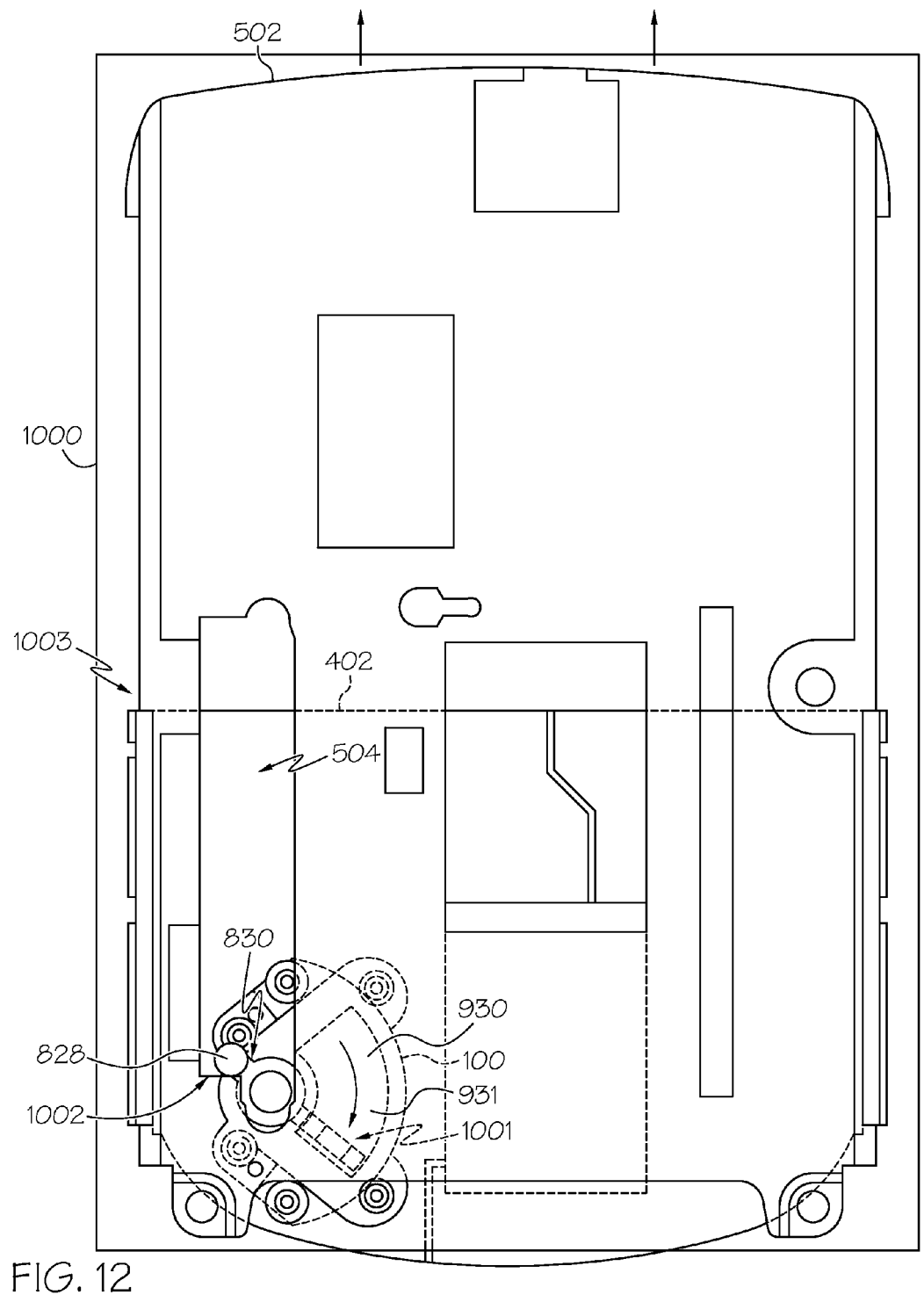

Turning now to FIGS. 10-12, FIGS. 10-12 show the portable electronic device 1000 comprising a slide mechanism 1003 with the low profile damper assembly 100 coupled thereto. In one example, the slide mechanism 1003 comprises the guide base 402, slide plate 502, and any components and/or mechanisms that allow the guide base 402 and slide plate 502 to transition with respect to each other. In the example shown in FIGS. 10-12, the low profile damper assembly 100 is coupled to the guide base 402. It should be noted that the example of FIGS. 10-12, show the slide plate 502 being transitioned in a first direction with respect to the guide base 402 while the guide base 402 remains stationary. However, it should be noted that other configurations are applicable as well. The engagement area 504 of the slide plate 502 can be disposed on the slide plate 502 in various locations to accommodate various configurations of the guide base 402 and slide plate 502.

FIG. 10 shows the slide plate 502 in a first or non-extended position with respect to the base 402. FIG. 10 also shows that a first portion 1002 of the engagement area 504 of the slide plate 502 abuts the outer wall 830 of the vertical engagement member 828 when the slide plate 502 is in the non-extended position. As the slide plate 502 is transitioned from a non-extended position to a second or an extended position, the vertical engagement member 828 of the pivot arm 1001 of the damper assembly 100 travels within the engagement area 504 of the slide plate 502. When the slide plate 502 has traveled a predetermined distance or is within a predetermined distance from its end of travel, the vertical engagement member 828 abuts a second portion 1102 of the engagement area 504 that is situated opposite from the first portion 1002 of the engagement area 504, as shown in FIG. 11.

As the slide plate 502 continues to transition to its fully extended position, the second portion 1102 of the engagement area 504 of slide plate 502 exerts a constant force against the outer wall 830 of the vertical engagement member 828. This force causes the pivot arm 1001 to pivot around the vertical member 220 of the bottom portion 104 of the housing 102. This pivoting motion rotates the first elongated member 620 and its extended region 622 of the first portion 110 of the pivot arm 1001 through fluid or viscous material within the reservoir, as shown in FIG. 12. It should be noted that the dampening assembly 100 can be configured to move the pivot arm in a linear motion as compared to a pivoting motion.

As the member 620 and its extended region 622 rotate through the reservoir the fluid or viscous material exerts a force thereon. This force is translated back to the slide plate 502 as a dampening force, thereby reducing the velocity of travel of the slide plate 502. As the slide plate 502 is transitioned back to its non-extended position, the pivot arm of the damper assembly 100 is rotated back to the position shown in FIG. 10 by the first portion 1002 of the engagement area 504 of the slide plate 502. A similar dampening force is exerted by the dampener assembly 100 as that already discussed above with respect to FIG. 12.

As can be seen, the damper assembly 100 provides a dampening force that reduces a velocity of the slide mechanism 1003 as the slide mechanism reaches a given distance from its end of travel. This reduces forces experienced by the components of the slide mechanism 1003 that are utilized to stop the slide mechanism. Also, undesired noises resulting from the slide mechanism 1003 being stopped are reduced or eliminated by the damper assembly 100 since the velocity of the slide mechanism is dampened. Even further, because the velocity of the slide mechanism 1003 is dampened at the end of its travel, a user experiences a smoother, more enjoyable sliding motion.

Non-limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A dampening assembly for a portable electronic device, the dampening assembly comprising:
    a housing comprising a top portion and a bottom portion;
    a pivot arm pivotably coupled to the bottom portion of the housing;
    a reservoir defined between the top portion and the bottom portion, the reservoir comprising at least one of a fluid and a viscous material, wherein a separately formed first portion of the pivot arm is disposed within the reservoir, and wherein a separately formed second portion of the pivot arm extends through and above the top portion of the housing; and
    a fastening member for maintaining the first portion of the pivot arm in contact with the second portion of the pivot arm and for preventing the pivot arm from lifting out of the housing, wherein the fastening member mates with the bottom portion of the housing at a location outside of the reservoir,
    wherein the top portion of the housing comprises:
    a first recessed area that extends from a bottom surface of the top portion towards a top surface of the top portion, and
    a first cavity that extends through the to surface and the bottom surface of the to portion, and
    wherein the bottom portion comprises:
    a second recessed area extending from a top surface of the bottom portion towards a bottom surface of the bottom portion, the second recessed area comprising a vertical member extending above the top surface of the bottom portion, the vertical member being disposed in the second recessed area at a location that substantially corresponds to the first cavity of the to portion, wherein the first recessed area and the second recessed area define the reservoir, and wherein the fastening member mates with a cavity of the vertical member.

2. The dampening assembly of claim 1, further comprising:
    a gasket disposed between and abutting the top portion and the bottom portion of the housing.

3. The dampening assembly of claim 1, wherein the at least one of the fluid and the viscous material exerts a force against the pivot arm as the pivot arm rotates through the reservoir.

4. The dampening assembly of claim 1, wherein the second portion of the pivot arm comprises:
    a second annular member comprising a second outer wall and a second inner wall defining a second cavity, wherein a portion of the vertical member is disposed within the second cavity; and
    a second elongated member extending outward from the second outer wall, the second elongated member comprising a vertical engagement member extending from a top surface of the second elongated member and above a top surface of the second annular member, wherein at least a portion of the vertical engagement member extends above the top surface of the top portion of the housing.

5. The dampening assembly of claim 4, wherein a sealing member is disposed within the first cavity of the top portion of the housing, wherein an inner portion of the sealing member circumscribes and abuts the second outer wall of the second annular member of the second portion of the pivot arm, and wherein an outer portion of the sealing member is circumscribed by and abuts a wall of the first cavity of the top portion of the housing.

6. The dampening assembly of claim 4, wherein the first portion of the pivot arm is disposed below the second portion of the pivot arm, and wherein the first portion of the pivot arm comprises:
an annular member comprising an outer wall and an inner wall defining a third cavity, wherein the third cavity circumscribes the vertical engagement member; and
an elongated member extending outward from the outer wall.

7. The dampening assembly of claim 6, wherein the vertical engagement member is configured to engage a portion of a slide mechanism disposed on a portable electronic device as the slide mechanism travels from at least a first position to a second position, the portion of the slide mechanism exerting a force on the vertical engagement member, wherein the pivot arm is configured to pivot about the vertical engagement member in response to the force, the elongated member being rotated through the at least one of the fluid and the viscous material as the pivot arm pivots about the vertical engagement member, the vertical engagement member exerting a dampening force against the slide mechanism in response to the elongated member being rotated through the at least one of the fluid and the viscous material.

8. A slide mechanism for a portable electronic device, the slide mechanism comprising:
a guide base;
a slide plate, wherein the guide base and the slide plate are configured to move in a linear direction with respect to each other; and
a dampening assembly, coupled to the guide base, the dampening assembly comprising:
a housing comprising a top portion and a bottom portion;
a pivot arm pivotably coupled to the bottom portion of the housing;
a reservoir defined between the top portion and the bottom portion of the housing, the reservoir comprising at least one of a fluid and a viscous material, wherein a separately formed first portion of the pivot arm is disposed within the reservoir, and wherein a separately formed second portion of the pivot arm extends through and above the top portion of the housing; and
a fastening member for maintaining the first portion of the pivot arm in contact with the second portion of the pivot arm and for preventing the second portion of the pivot arm from lifting out of the housing,
wherein the top portion of the housing comprises:
a first recessed area that extends from a bottom surface of the top portion towards a top surface of the top portion, and
a first cavity that extends through the to surface and the bottom surface of the top portion, and
wherein the bottom portion of the housing comprises:
a second recessed area extending from a top surface of the bottom portion towards a bottom surface of the bottom portion, the second recessed area comprising a vertical member extending above the top surface of the bottom portion, the vertical member being disposed in the recessed area at a location that substantially corresponds to the first cavity of the top portion, wherein the first recessed area and the second recessed area define the reservoir, and wherein the fastening member mates with a cavity of the vertical member.

9. The slide mechanism of claim 8, wherein the second portion of the pivot arm comprises:
a second annular member comprising a second outer wall and a second inner wall defining a second cavity, wherein a portion of the vertical member is disposed within the second cavity; and
a second elongated member extending outward from the second outer wall, the second elongated member comprising a vertical engagement member extending from a top surface of the second elongated member and above a top surface of the second annular member, wherein at least a portion of the vertical engagement member extends above the top surface of the top portion of the housing and is configured to engage an engagement area of the slide plate of the slide mechanism,
wherein a sealing member is disposed within the first cavity of the top portion of the housing, wherein an inner portion of the sealing member circumscribes and abuts the second outer wall of the second annular member of the second portion of the pivot arm, and wherein an outer portion of the sealing member is circumscribed by and abuts a wall of the first cavity of the top portion of the housing.

10. The slide mechanism of claim 9, wherein the first portion of the pivot arm is disposed below the second portion of the pivot arm, and wherein the first portion of the pivot arm comprises:
a first annular member comprising a first outer wall and a first inner wall defining a third cavity, wherein the third cavity circumscribes the vertical member, and
a first elongated member extending outward from the first outer wall;
wherein the slide plate of the slide mechanism is configured to move in a linear direction with respect to the guide base of the slide mechanism, the vertical engagement member engaging a portion of the engagement area as the slide plate transitions from at least a first position to a second position, the engagement area exerting a force on the vertical engagement member; and
wherein the pivot arm is configured to pivot about the vertical member in response to the force, the first elongated member being rotated through the at least one of the fluid and the viscous material as the pivot arm pivots about the vertical member, the vertical engagement member exerting a dampening force against the slide plate in response to the first elongated member being rotated through the at least one of the fluid and the viscous material.

11. A portable electronic device, comprising:
a first portion;
a second portion; and
a slide mechanism, wherein the first portion is coupled to a guide base of the slide mechanism, and the second portion is coupled to a slide plate of the slide mechanism, and wherein the slide mechanism comprises a dampening assembly coupled to the guide base, the dampening assembly comprising:

a housing comprising a top portion and a bottom portion;

a pivot arm pivotably coupled to the bottom portion of the housing;

a reservoir defined between the top portion and the bottom portion, the reservoir comprising at least one of a fluid and a viscous material, wherein a separately formed first portion of the pivot arm is disposed within the reservoir, and a separately formed second portion of the pivot arm extends through and above the top portion of the housing; and a fastening member for maintaining the first portion of the pivot arm in contact with the second portion of the pivot arm and for preventing the second portion of the pivot arm from lifting out of the housing, wherein the to portion of the housing comprises:

a first recessed area that extends from a bottom surface of the top portion towards a top surface of the top portion, and a first cavity that extends through the to surface and the bottom surface of the top portion, and wherein the bottom portion of the housing comprises:

a second recessed area extending from a top surface of the bottom portion towards a bottom surface of the bottom portion, the second recessed area comprising a vertical member extending above the top surface of the bottom portion, the vertical member being disposed in the recessed area at a location that substantially corresponds to the first cavity of the to portion, wherein the first recessed area and the second recessed area define the reservoir, and wherein the fastening member mates with a cavity of the vertical member.

12. The portable electronic device of claim 11, wherein the second portion of the pivot arm comprises:

a second annular member comprising a second outer wall and a second inner wall defining a second cavity, wherein a portion of the vertical member is disposed within the second cavity; and a second elongated member extending outward from the second outer wall, the second elongated member comprising a vertical engagement member extending from a top surface of the second elongated member and above a top surface of the second annular member, wherein at least a portion of the vertical engagement member extends above the top surface of the top portion of the housing and is configured to engage an engagement area of the slide plate, wherein a sealing member is disposed within the first cavity of the top portion of the housing, wherein an inner portion of the sealing member circumscribes and abuts the second outer wall of the second annular member of the second portion of the pivot arm, and wherein an outer portion of the sealing member is circumscribed by and abuts a wall of the first cavity of the top portion of the housing.

13. The portable electronic device of claim 12, wherein the first portion of the pivot arm is disposed below the second portion of the pivot arm, and wherein the first portion of the pivot arm comprises:

an annular member comprising an outer wall and an inner wall defining a third cavity, wherein the third cavity circumscribes the vertical member; and an elongated member extending outward from the outer wall.

14. The portable electronic device of claim 13, wherein the slide plate is configured to move in a linear direction with respect to the guide base, the vertical engagement member engaging a portion of the engagement area as the slide plate transitions from at least a first position to a second position, the engagement area exerting a force on the vertical engagement member, wherein the pivot arm is configured to pivot about the vertical engagement member in response to the force, the first elongated member being rotated through the at least one of the fluid and the viscous material as the pivot arm pivots about the vertical engagement member, the vertical engagement member exerting a dampening force against the slide plate in response to the first elongated member being rotated through the at least one of the fluid and the viscous material.

\* \* \* \* \*